United States Patent
Berger et al.

(10) Patent No.: US 8,714,247 B1
(45) Date of Patent: May 6, 2014

(54) SULFONATED AMPHOTERIC SURFACTANTS FOR IOR

(71) Applicants: Paul Daniel Berger, Sugar Land, TX (US); Christie Huimin Berger, Sugar Land, TX (US); Susanta Mohapatra, Sugar Land, TX (US)

(72) Inventors: Paul Daniel Berger, Sugar Land, TX (US); Christie Huimin Berger, Sugar Land, TX (US); Susanta Mohapatra, Sugar Land, TX (US)

( * ) Notice: Subject to any disclaimer, the term of this patent is extended or adjusted under 35 U.S.C. 154(b) by 0 days.

(21) Appl. No.: 13/998,108

(22) Filed: Oct. 1, 2013

(51) Int. Cl.
  *E21B 43/22* (2006.01)
(52) U.S. Cl.
  USPC .......... 166/270.1; 166/268; 166/369
(58) Field of Classification Search
  CPC .......... C09K 8/58; C09K 8/584; C09K 8/602; C09K 8/604
  See application file for complete search history.

(56) References Cited

U.S. PATENT DOCUMENTS

| | | |
|---|---|---|
| 5,371,250 A | 12/1994 | Seitz et al. |
| 7,373,977 B1 | 5/2008 | Berger et al. |
| 7,556,098 B2 | 7/2009 | Berger et al. |
| 2006/0084579 A1* | 4/2006 | Berger et al. .......... 507/129 |
| 2008/0302531 A1* | 12/2008 | Berger et al. .......... 166/270.1 |
| 2011/0028355 A1* | 2/2011 | Berger et al. .......... 507/213 |
| 2011/0092735 A1* | 4/2011 | Peng et al. .......... 564/96 |

OTHER PUBLICATIONS

Ren and Luo Dynamic Interfacial Tension Behavior of Alkyl Amino Sulfonate in Crude Oil-Brine System. Tensive Surf. Del 50 (2013) 5 p. 369-375.

* cited by examiner

*Primary Examiner* — Angela M DiTrani

(57) ABSTRACT

Sulfonated betaines amine oxides, and sultaines are made by the reaction of the corresponding unsaturated betaines or sultaines. These are formulated into injection fluids suitable for the recovery of residual oil from subterranean reservoirs. The sulfonated betaines, amine oxides, and sultaines exhibit lower adsorption onto reservoir rock compared to their corresponding unsulfonated betaines, amine oxides, and sultaines. They can be used in applications where their respective amphoteric surfactants are currently used such as personal care, mining, improved oil recovery (IOR), oil field drilling, fracturing, acidizing, foaming, oil field stimulation, and agricultural formulations.

7 Claims, No Drawings

SULFONATED AMPHOTERIC SURFACTANTS FOR IOR

FIELD OF INVENTION

This invention discloses the application of certain sulfonated amphoteric surfactants, including but not limited to, sulfonated betaines, amine oxides, sulfobetaines, and hydroxy sultaines for various uses and especially Improved Oil Recovery (IOR). A corresponding patent application for the composition of matter of these amphoteric surfactants has been filed simultaneously with this filing.

BACKGROUND AND DESCRIPTION OF PRIOR ART

Amphoteric surfactants have been used for many applications including but not limited to personal care, mining, IOR, oil field drilling, fracturing, acidizing, foaming, agricultural formulations because of their unique properties, such as electrolyte tolerance, hard water tolerance, mildness and low irritation, foaming, wetting, reduced interfacial tension, viscoelasticity, and thermal stability. U.S. Pat. No. 7,373,977 discloses the use of certain amidopropyl dimethyl betaines and alkyl dimethyl betaines as viscoelastic surfactants for oil well stimulations. U.S. Pat. No. 7,556,098 discloses the use of certain unsaturated amidopropyl dimethyl betaine, alkyldimethyl betaines, amidopropyl dimethyl sultaines, and alky dimethyl sultaines to lower interfacial tension (IFT) to ultralow values for the recovery of residual oil. However, for oil field applications, one of the short comings of these products is their high adsorption to solid surfaces. The high adsorption of the amphoteric surfactants prevents the surfactant from propagating through the reservoir and the oil recovery is limited.

It would be very valuable if an amphoteric surfactant or surfactants could be developed having all the desired properties of existing amphoteric surfactants along with low adsorption onto solid phase. This allows these sulfonated amphoteric surfactants to be used in applications where adsorption is a critical factor.

BRIEF DESCRIPTION OF THE INVENTION

The invention involves the use of various sulfonated amphoteric surfactants, including but not limited to, alkyl amidopropyl betaine sulfonates, alkyl dimethyl betaine sulfonates, alkyl hydroxy sultaines sulfonates, alkyl sulfobetaine sulfonates and alkyl amine oxide sulfonates as low adsorbing surfactants for applications including but not limited to, IOR, drilling, viscoelastic surfactant, acidizing, fracturing, foaming and production. The present invention involves using a sulfonating agent to react with the double bond of certain amphoteric surfactants, including but not limited to, alkylene amidopropyl betaines, alkylene dimethyl betaines, alkylene hydroxy sultaines, alkylene sulfobetaines, and, alkylene amine oxide to make the corresponding sulfonated amphoteric surfactants. The sulfonated amphoteric surfactants have been found to give ultra-low interfacial tension (IFT), viscoelastic properties, compatibility with brines containing high salt and divalent ions, and, low adsorption onto reservoir rock.

DETAILED DESCRIPTION OF THE INVENTION

The invention involves the use of various sulfonated amphoteric surfactants, including but not limited to, alkyl amidopropyl betaine sulfonates, alkyl dimethyl betaine sulfonates, alkyl hydroxy sultaines sulfonates, alkyl sulfobetaine sulfonates, and alkyl amine oxide sulfonates as low adsorbing surfactants for applications including but not limited to, IOR, drilling, viscoelastic surfactant, acidizing, fracturing, foaming, and production with the surfactants having the following structure:

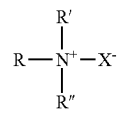

Where

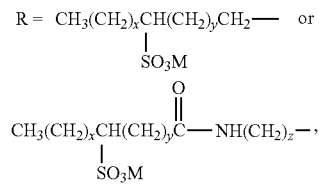

R'=C1-C6 alkyl,
R"=C1-C6 alkyl or

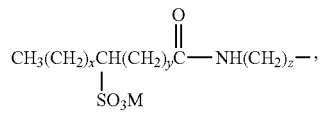

X=(CH$_2$)aCOO or CH$_2$CH(OH)CH$_2$SO$_3$ or (CH$_2$)bSO$_3$ or O,
x=4-28,
y=4-28,
z=1-6,
a=1-3,
b=1-6,
M=mono or divalent metal cation or ammonium cation.

The unsaturated amphoteric surfactants are sulfonated by methods known to the art including but not limited to falling film sulfur trioxide sulfonation, meta-bisulfite sulfonation, chloro sulfonic acid sulfonation, sulfamic acid sulfonation, cold SO$_2$/SO$_3$ sulfonation. In cases where sulfonic acids are form, for example using sulfur trioxide, the product is neutralized to form a salt.

Unsaturated R groups include but are not restricted to palmitoleyl, myristoleyl, oleyl, erucyl, nervonyl. They may be present individually or as mixtures of two or more as found naturally or synthetically blended.

The sulfonated amphoteric surfactant(s) of the present invention have been shown to have lower adsorption rate onto the solids, increased solubility in various brines and to provide equivalent or lower IFT compared to corresponding to their unsulfonated amphoteric surfactants. The lowering of the IFT to ultra-low values of less than 0.02 mN/m has been shown to be essential in recovering residual oil from a subterranean reservoir. Generally one or more surfactants are introduced into one or more injection wells by dissolving the surfactant(s) in water or brine that may contain mono and/or divalent inorganic salts. The injected solution containing the surfactant(s) contacts the trapped oil within the reservoir and the oil is recovered from one or more producing wells. In some cases the injection well may serve as the producing well in a process known as huff and puff. In other cases the injection and producing wells are different in a process known as surfactant flooding. Various other ingredients may be added to the injection brine along with the surfactants as is known to the art. These include, but are not restricted to one or more of the following: viscosifiers, scale inhibitors, chelating agents, alkalis, buffering agents, and co-solvents.

The composition of the injection fluid is as follows:

(a) 0.01 to 5 wt % of one or more surfactants of the present invention, (b) an aqueous injection fluid, (c) 0-5 wt % of one or more alkali, (d) 0-1% of one or more viscosifiers, (e) 0-50 wt % of one or more co-solvents;

(f) 0-50 wt % of one or more co-surfactants, and;

(g) 0-5 wt % of one or more co-surfactants.

The aqueous carrier includes but is not restricted to water, produced brine, river water, synthetic brine, sea water.

Examples of alkalis that may be used include but are not limited to sodium hydroxide, sodium carbonate, sodium borate, sodium silicate. Alkalis are used as is known in the art to form "in situ" surfactant that act synergistically with the injected surfactant in some cases. Alkali is used at concentration of from 0 to about 5 wt % of the injection fluid.

Examples of viscosifiers that may be used include but are not limited to polyacrylamides, AMPS co-polymers, xanthan gum, other natural; and synthetic gums and polymers generally known to the art and used to increase the viscosity of the injection fluid when necessary to control mobility and sweep efficiency. Viscosifiers are used at concentrations of 0 to about 1 wt % of the injection fluid.

Examples of co-solvents sometimes used, as is known to the art, to reduce the viscosity of the injection fluid, improve freeze-thaw or compatibility at high concentrations, include but are not limited to C1-C8 alcohols, C1-C8 alcohol alkoxylates, and glycerin. Co-solvents are used at concentrations of 0 to about 50 wt % of the injection fluid.

Examples of co-surfactants that may be used include one or more chosen from the group anionic surfactants, cationic surfactants, amphoteric surfactants, nonionic surfactants. These have been used by those familiar with the art. Co-surfactants are used at concentrations of 0 to about 5 wt % of the total injection liquid formulation.

EXAMPLES

Example 1

Comparison of Adsorption of Sulfonated Amphoterics to their Corresponding Unsulfonated Amphoterics Adsorption tests were carried out using 0.2% surfactant solution in brine. Fine sand (−40+100 mesh) was used for the adsorption tests. !0 grams of sand was combined with 50 grams of surfactant solution and shaken 16 hours on a wrist shaker. The sand was then allowed to settle from the surfactant solution and the upper solution was analyzed for surfactant concentration to determine the extent of loss by adsorption.

TABLE 1

| Adsorption data | |
| --- | --- |
| surfactant | Adsorption, mg/g |
| C18-dimethyl betaine | 2.4-2.7 |
| C18-dimethyl betaine sulfonate | 0.7-0.8 |
| C18-dimethyl sultaine | 1.5-1.8 |
| C18-dimethyl sultaine sulfonate | 0.3-0.6 |

Example 2

Comparison of the IFT Before and after Adsorption

The IFT of surfactant at various concentrations in sea water was measured against a Southeast Asian crude oil, API gravity=24, at 90° C. using a Grace Model 6500 Spinning Drop Tensiometer. Table 2 shows the IFT of the sulfonated C18 dimethyl hydroxy sultaine and C18 dimethyl hydroxy sultaine before and after adsorption. These results confirm the superior IFT reducing properties of the sulfonated hydroxy sultaine compared to an unsulfonated hydroxy sultaine due to the lower adsorption of the former. Lowering the adsorption will reduce the loss of surfactant and greatly improve the efficiency of the surfactant to be used in applications including but not limited to IOR, fracturing, acidizing and drilling.

TABLE 2

| IFT data | | |
| --- | --- | --- |
| Surfactant in Seawater | IFT, before adsorption, mN/m @ 90° C. | IFT, after Adsorption, mN/m @ 90 C. |
| 0.1% C18-hydroxy sultaine | 0.0035 | >1 |
| 0.2% C18-hydroxy sultaine | 0.00512 | 0.2712 |
| 0.3% C18-hydroxy sultaine | 0.0132 | 0.0956 |
| 0.1% C18-hydroxy sultaine sulfonate | 0.00298 | 0.00561 |
| 0.2% C18-hydroxy sultaine sulfonate | 0.00411 | 0.0021 |
| 0.3% C18-hydroxy sultaine sulfonate | 0.0086 | 0.00521 |

The previous examples demonstrate the low adsorption properties of the sulfonated amphoteric surfactants. This low adsorption is accomplished without sacrificing any of the other properties of their corresponding unsulfonated versions, for example, the lowering of IFT. For this reason the sulfonated amphoteric surfactants may be used in all applications where unsulfonated amphoterics are employed but low adsorption is required or desired.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The invention claimed is:

1. A process of recovering residual oil from subterranean reservoirs by injecting into one or more injection wells, an aqueous solution containing a) one or more sulfonated amphoteric surfactants of the structure

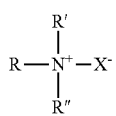

Where

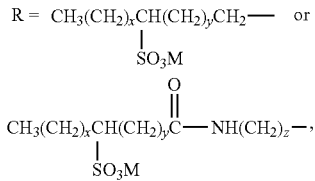

R'=C1-C6 alkyl,
R"=C1-C6 alkyl or

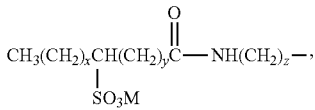

X=(CH₂)aCOO or CH₂CH(OH)CH₂SO₃ or (CH₂)bSO₃ or O,
x=4-28,
y=4-28,
z=1-6,
a=1-3,
b=1-6,
M=mono or divalent metal cation or ammonium cation,
b) an aqueous injection fluid,
c) 0-5 wt % or more alkali,
d) 0-1% of one or more viscosifiers,
e) 0-50 wt % of one or more co-solvents;
f) 0-5 wt % of one or more co-surfactants, and;
recovering the oil from one or more production wells.

2. The process of recovering residual oil from a subterranean reservoir described in claim 1 where the aqueous injection fluid is selected from the group: water, oilfield brine, seawater, river water, synthetic brine, and recovered brine.

3. The process of recovering residual oil from a subterranean reservoir described in claim 1 where the one or more injection wells are different wells from the one or more production wells.

4. The process of recovering residual oil from a subterranean reservoir described in claim 1 where the one or more injection wells are the same wells as the one or more production wells.

5. The process of recovering residual oil from a subterranean reservoir described in claim 1 where the alkali is selected from the group: sodium hydroxide, sodium carbonate, sodium borate, and sodium silicate.

6. The process of recovering residual oil from a subterranean reservoir described in claim 1 where the one or more viscosifiers is selected from the group: polyacrylamides, AMPS co-polymers, xanthan gum, other natural gums, and synthetic gums.

7. The process of recovering residual oil from a subterranean reservoir described in claim 1 where the one or more co-solvents is selected from the group: C1-C8 alcohols, C1-C8 alcohol alkoxylates, and glycerin.

* * * * *